US010289580B2

(12) United States Patent
Grossi et al.

(10) Patent No.: US 10,289,580 B2
(45) Date of Patent: May 14, 2019

(54) DETERMINISTIC CONTROL SYSTEM FOR THE OPERATION OF DATA TRANSFER MEANS BY DIRECT MEMORY ACCESS

(71) Applicant: Thales, Courbevoie (FR)

(72) Inventors: Philippe Jean-Pierre Louis Grossi, Valence (FR); Dominique David, Valence (FR); Frédéric Jacques Jean-Marie Berthoz, Valence (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/788,828

(22) Filed: Oct. 20, 2017

(65) Prior Publication Data
US 2018/0113827 A1   Apr. 26, 2018

(30) Foreign Application Priority Data
Oct. 25, 2016 (FR) ...................... 16 01540

(51) Int. Cl.
*G06F 9/46* (2006.01)
*G06F 11/14* (2006.01)
*G06F 13/28* (2006.01)
*G06F 13/32* (2006.01)
*G06F 9/4401* (2018.01)

(52) U.S. Cl.
CPC ............ *G06F 13/32* (2013.01); *G06F 9/4418* (2013.01); *G06F 9/461* (2013.01); *G06F 11/1451* (2013.01); *G06F 13/28* (2013.01); *G06F 2201/84* (2013.01)

(58) Field of Classification Search
CPC ........ G06F 13/32; G06F 13/28; G06F 9/4418; G06F 9/461; G06F 11/1451
See application file for complete search history.

(56) References Cited

U.S. PATENT DOCUMENTS

| 5,809,335 | A | * | 9/1998 | Kamiya | .................. G06F 13/28 710/22 |
| 5,974,479 | A | * | 10/1999 | Satoh | ...................... G06F 13/30 710/22 |
| 2004/0187135 | A1 | * | 9/2004 | Pronovost | ............. G06F 9/4881 718/104 |
| 2005/0050241 | A1 | * | 3/2005 | Furuta | ..................... G06F 13/28 710/22 |
| 2006/0004946 | A1 | | 1/2006 | Shah et al. | |

(Continued)

FOREIGN PATENT DOCUMENTS

| EP | 1503292 A2 | 2/2005 |
| FR | 2960989 A1 | 12/2011 |
| WO | 2015144488 A1 | 10/2015 |

OTHER PUBLICATIONS

French Patent Application No. 16 01540, Rapport de Recherche Préliminaire, Jul. 4, 2017, 3 pages.

*Primary Examiner* — Glenn A. Auve
(74) *Attorney, Agent, or Firm* — Soquel Group LLC

(57) ABSTRACT

This system determines the operation of data transfer means by direct memory access by a task scheduler in charge of process context changes, the system including deterministic means for establishing and suspending the data transfers of memory data initiated before, but not terminated during, the contextual changes, and for resuming the data transfers during the return to the corresponding initial context, in order to give each process full and exclusive access to the means of transfer.

9 Claims, 3 Drawing Sheets

(56) References Cited

U.S. PATENT DOCUMENTS

| | | | |
|---|---|---|---|
| 2007/0129824 A1* | 6/2007 | Sato | G03F 7/70525 |
| | | | 700/56 |
| 2009/0254771 A1* | 10/2009 | So | G06F 1/3215 |
| | | | 713/323 |
| 2011/0022767 A1* | 1/2011 | Chun | G06F 13/32 |
| | | | 710/308 |
| 2012/0036337 A1* | 2/2012 | Grossi | G06F 9/4881 |
| | | | 712/208 |
| 2017/0083465 A1* | 3/2017 | Jan | G06F 13/28 |

\* cited by examiner

DETERMINISTIC CONTROL SYSTEM FOR THE OPERATION OF DATA TRANSFER MEANS BY DIRECT MEMORY ACCESS

CROSS REFERENCE TO RELATED APPLICATIONS

This application claims priority under 35 USC § 119 of French Patent Application No. 16 01540 filed on Oct. 25, 2016.

FIELD OF THE INVENTION

The present invention relates to a system for controlling the operation of data transfer means by direct memory access.

More particularly, the invention relates to a system for controlling such means, by a task scheduler in charge of changing process context.

Such a system may, for example, be implemented to ensure a robust partitioning of various processes implemented by at least one processor.

In such a system, the processor is in fact associated with data transfer means by direct memory access.

In this type of system, the functioning of all of these means is controlled by a task scheduler responsible for changing the process context of the processor.

The invention may then be implemented, for example, in fields of application requiring at least a strong temporal isolation between the various processes, also referred to as robust partitioning.

Such applications are found, for example, in systems with high operational safety requirements, such as, in particular, aeronautics, and in the nuclear, medical, and transport fields, etc.

More particularly, the invention relates to the hardware-assisted data transfer aspects of memory, also referred to as Direct Memory Access, or DMA.

BACKGROUND OF THE INVENTION

In modern processors, access to memory and intra- or inter-memory transfers are relatively frequent and may affect, in particular, the overall performance of the system and, more particularly, when the access times to the memories lengthen.

In order to solve these problems, transfer automatons are used to offload the main processor, which may thus continue to perform other tasks in parallel.

This paralleling of the transfers to memory may lead to an overflow of the system onto another process, as will be described in greater detail below.

Thus, a first process may initiate a transfer within its temporal domain, but the transfer may continue beyond this domain and interfere with a second process.

In robustly partitioned systems, this type of interference leading to non-determinism is prohibited.

It is thus necessary to perfectly master DMA transfers in order to avoid any temporal interference between the processes.

It is known that in current systems, temporal interferences of this nature between processes are resolved or circumvented by means of various management mechanisms.

Thus solutions to these problems are known, such as dividing transfers into small batches of short duration, or by increasing the margins associated with each process in order to absorb the potential overflows, or even by grouping the transfers at the beginning of partition.

But all of these bypass techniques are not trouble-free or without effect.

In the case of batching, each transfer incurs a loading penalty of the DMA for its initialization.

Batching therefore amounts to increasing the number of transfers and thus the loading penalties.

If the batching is too detailed, DMA loading becomes more important than the transfers, which is counterproductive.

If the batching is insufficient, the determinism of the transfer within the affected temporal envelope is no longer controlled.

If the margins are increased, this reduces the useful load allocated to the process, and therefore the processor is not fully exploited.

Finally, the grouping of transfers at the beginning of the partition results in severe constraints on the application program and is, therefore, hardly applicable in practice.

SUMMARY OF THE DESCRIPTION

The object of the invention is, therefore, to solve these problems.

To this end, the object of the invention is to provide a system for the deterministic control of the functioning of data transfer means by direct memory access, by means of a task scheduler responsible for changing process contexts, characterized in that the system comprises deterministic means for establishing and suspending the data transfers of memory data initiated before, and not terminated during, the contextual changes, and then resuming them during the return to the corresponding initial context, in order to give each process full and exclusive access to the means of transfer.

According to other characteristics of the system according to the invention, taken alone or in combination:

means for suspension and resumption comprise means for the interruption and resumption of the data transfers, and means for saving the current status of the system and for transferring data to the memory;

means for backing up the current status of the system and for transfer of data into memory comprising status registers;

the system is associated with control registers for the suspension of the transfer and resumption of the transfer;

the system is associated with an autonomous programmable suspension clock for transfer in the event of temporal overflow;

the system is associated with a hardware transfer suspension line.

BRIEF DESCRIPTION OF THE DRAWINGS

The invention will be better understood upon reading the description which follows, given solely by way of example and made with reference to the accompanying drawings, wherein.

DETAILED DESCRIPTION

Figure 1:
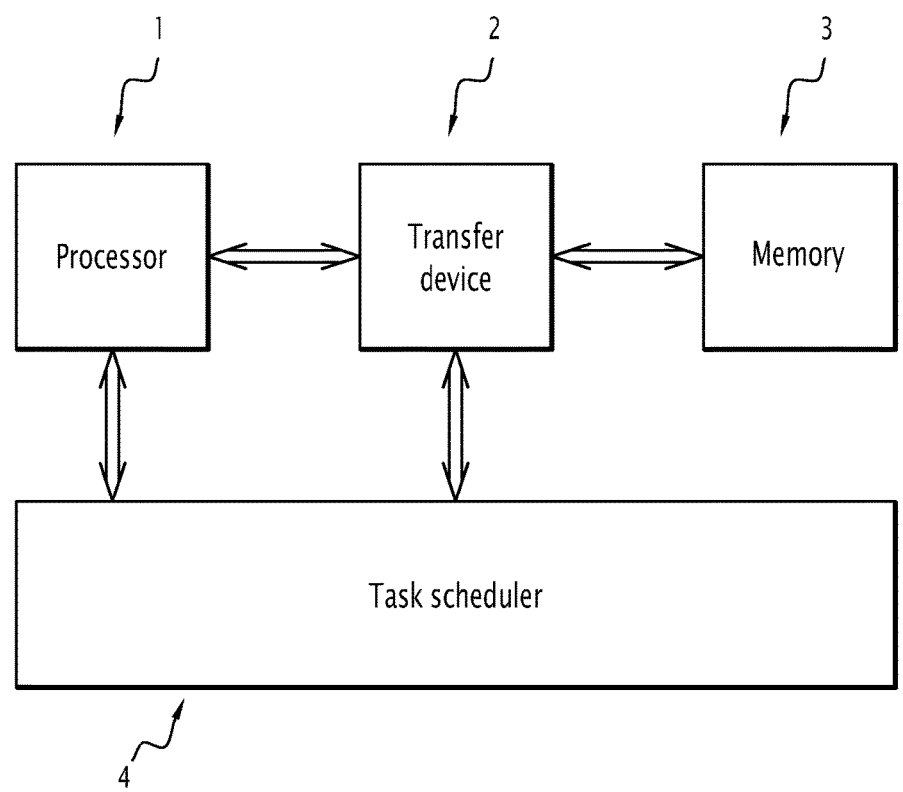
FIG. 1 shows a block diagram illustrating a processor and task scheduler system.

FIG. 1 shows a system which comprises at least one processor, designated by the general reference 1, associated with means for transferring data by direct memory access, referred to as DMA.

The transfer means are designated by the general reference 2, while the memory means are designated by the general reference 3.

The functioning of this assembly is controlled by a task scheduler designated by the general reference 4, and is, in particular, responsible for changing the process context of the processor.

Figure 2:
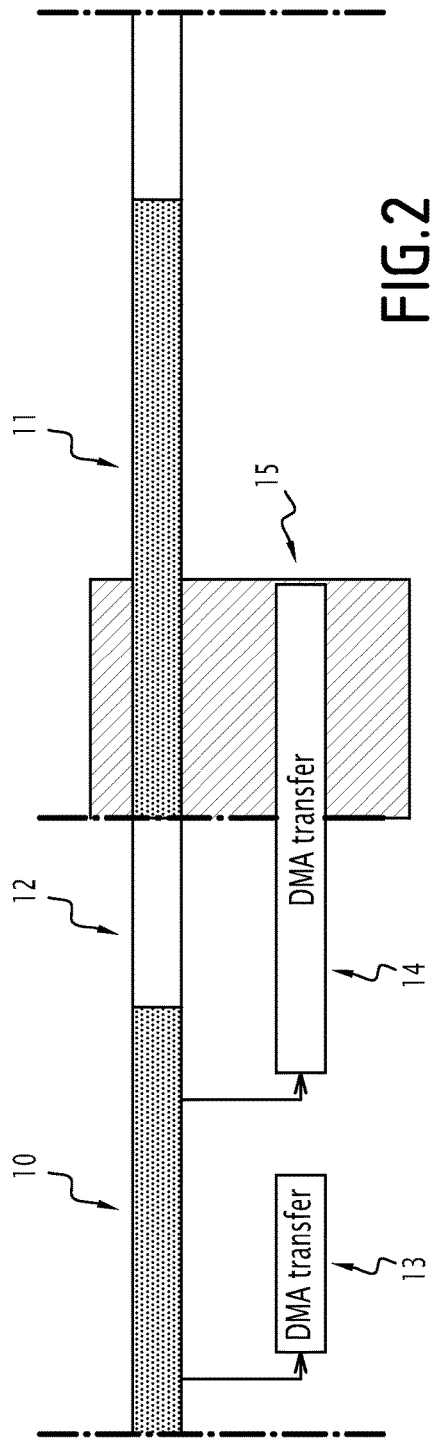
FIG. 2 shows a flow chart illustrating examples of temporal interference related to a DMA transfer according to the prior art.

In particular, and as illustrated in FIG. 2, this task scheduler is responsible for controlling the changing of the process context of the processor.

In particular, the task scheduler is responsible, for example, for converting this context, from one process, designated by the general reference 10, to another process, designated by the general reference 11, while respecting a temporal margin between them, designated by the general reference 12.

FIG. 2 shows two DMA transfers designated respectively by references 13 and 14.

The DMA transfer 13 is initiated during the process 10 and ends before the change of context.

The DMA transfer 14 is also launched within the temporal domain of the process 10, but the transfer should continue beyond the temporal window affected, and even exceed the margin 12, which leads it to interfere with the process 11.

This interference is designated by 15.

For examples of applications in robust partitioning systems, this type of interference, leading to non-determinism, is prohibited.

The invention then proposes to integrate in the system described, means for interrupting/suspending and resuming/restarting the DMA transfers, and controlled by the task scheduler responsible for changing the process context of the processor, in order to guarantee the determinism.

In this way, each process has full and exclusive access to the means of transfer.

The DMA transfers begun in one process context either terminate normally before the end of the affected temporal window or are suspended during the process context change and will only be resumed or restarted when the context is returned to the initial context.

The current status of the system and of the memory transfer is then backed up with the context, and then restored when the context is restarted or resumed.

Status registers are used for this purpose.

Thus, in such a system, it is possible to interrupt and resume a memory transfer in a deterministic manner, which is an indispensable property, for example, of robust partitioned systems.

A DMA transfer is thus made up of a plurality (or burst) of elementary transfers.

An elementary transfer consists of reading in the source zone, and writing in the destination zone.

The elementary transfer is limited temporally by the system in which the DMA transfer is implemented.

Since the DMA transfer may be stopped at any time and no internal memory is used, the suspension is temporally limited to N elementary transfers (e.g. 2).

Figure 3:
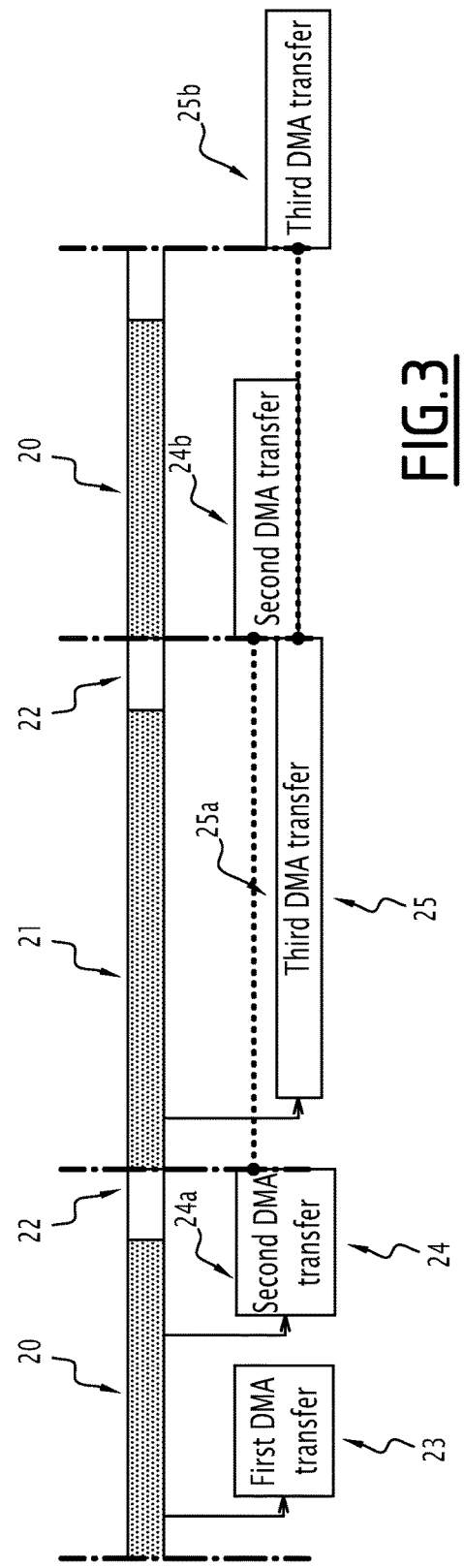
FIG. 3 shows a flow chart illustrating the operation of a system according to the invention according to a use in temporal partitioning.

This is illustrated, for example, in FIG. 3.

Two processes are illustrated in these figures, designated respectively by the references 20 and 21, and separated by exemplary margins 22.

A first DMA transfer 23 is initiated and terminated in the temporal window of the process 20.

A second DMA transfer 24 is also initiated during the context 20 but does not end in the temporal window.

Contrary to what happens in the prior art, in the system according to the invention, the task scheduler comprises means for suspending/interrupting data transfers in DMA memory, initiated before, but not completed during, the changes of the context of the processor and their resumption/restarting during the return of the processor to the corresponding initial context.

This is illustrated for example in the case of this second DMA transfer 24, which is suspended during the change of context from the process 20 to the process 21.

The second process 21 then obtains an allocated temporal window, enabling it to carry out transfers by direct memory access such as the DMA transfer 25.

As illustrated, at the end of the temporal window allocated to the process 21 associated with the margin 22, the transfer is suspended if the transfer is not fully completed.

During the return of the process context of the processor towards the first process 20, the data transfer to the DMA memory, initiated before the change of context and not completed in the corresponding window, is then resumed/restarted as illustrated in FIG. 3.

The beginning of the DMA transfer is in fact designated by the general reference 24a, while the end of the transfer is designated by the general reference 24b in FIG. 3.

The same applies to the third transfer by direct access to the memory 25, the first part of which is designated by the general reference 25a, while the end is designated by the general reference 25b.

Thus, by using this capacity to interrupt and resume a memory transfer in a deterministic way, each process has an integral and exclusive access to the DMA resources in its temporal context.

The interruption must, of course, be precise in order to allow a complete restoration of the context of the transfer.

Thus, the means for suspending and resuming comprise means for interrupting and resuming the data transfers and means for saving the current status of the system, and for transferring data into a memory comprising, for example, status registers.

This makes it possible to provide a set of information about the status of the system and also allows precise control of the functioning of the system.

The task scheduler will then load the processor by programming the internal registers of the DMA, source address, destination address, size, access rights, etc. . . . , start or stop it and, finally, unload it, i.e., backing up the current status of the DMA for later recovery.

The latter must therefore be able to ensure respect for the temporal isolation of all the addresses of the transfer by means of several mechanisms.

These mechanisms may, for example, comprise a main mechanism, for example for the host controller, in order to be able to interrupt the DMA at any time by programming the control registers thereof, and secondary mechanisms, for example associated with a programmable interruption clock timer in the event of a temporal overflow, or DMAs that may receive a hardware interruption line from the execution controller.

Thus, and in general, such a control system may then be associated with:

control registers for the suspension of the transfer and resumption of the transfer;

an autonomous programmable clock for suspending the transfer in the event of a temporal overflow;

a hardware transfer suspension line.

It is then conceivable that such a control system structure has a certain number of advantages, in particular, in terms of its determinism, which allows each process to have an integral and exclusive access to the DMA resources in its temporal context.

It goes without saying that other applications, other uses and other embodiments of this control system may be implemented.

Figure 4:
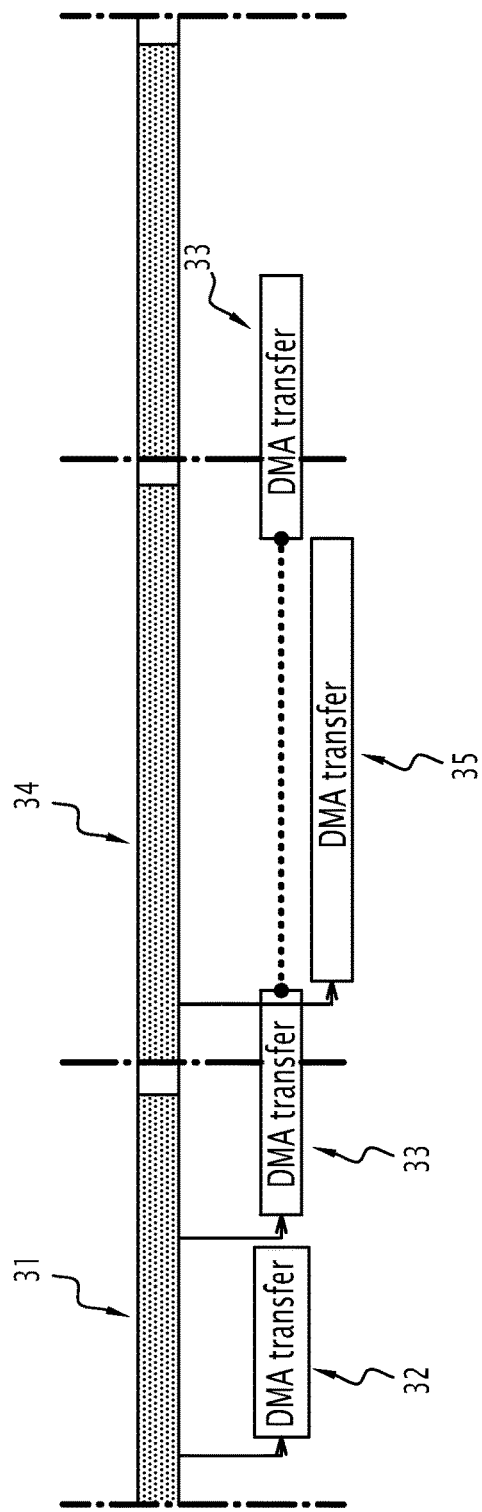
FIG. 4 shows a flow chart illustrating the operation of a system according to the invention according to a use as a shared resource.

Thus, for example, such a system may also be used within the framework of a shared resource as illustrated in FIG. 4.

In FIG. 4, a process 31 launches a short transfer 32 and then a second transfer that is not constrained temporally 33.

A process 34 then requires a higher priority transfer 35 (limited deadline), wherein the DMA is then interrupted (back up of its context) and this higher priority transfer 35 begins.

When this higher priority transfer 35 ends, the scheduler resumes the transfer 33.

This allows, for example, the OS to guarantee the latency of transfers with a limited deadline in the presence of other non-constrained transfers in the execution time.

The invention claimed is:

1. A control system comprising:
   a device implementing direct memory access; and
   a task scheduler (i) processing context changes of a main processor, (ii) establishing and suspending data transfers to a memory when the process context of the main processor changes, and (iii) suspending a current data transfer to the memory and saving a current status of data transfer to the memory prior to either establishing a new data transfer to the memory or to resuming a suspended data transfer,
   wherein the control system establishes, suspends and resumes data transfer to the memory in a deterministic manner,
   wherein each data transfer to the memory comprises a plurality of elementary transfers, each elementary transfer comprises reading in a source zone and writing in a destination zone, and suspending of data transfer to the memory is temporally limited to N elementary transfers, and
   wherein each process comprises an integral and exclusive access to data transfer resources in the memory in a temporal context of the process.

2. A control system according to claim 1, wherein the said task scheduler comprises means for saving a current status of the control system and a current status of data transfer to the memory.

3. A control system according to claim 2, wherein said means for saving the current status of the control system and the status of data transfer to the memory comprise status registers.

4. A control system according to claim 1, further comprising control registers for suspending data transfer and for resuming data transfer.

5. A control system according to claim 1, further comprising an autonomous programmable clock suspending data transfer in response to a temporal overflow event.

6. A control system according to claim 1, further comprising hardware suspending data transfer.

7. A control system according to claim 1, wherein the control system interrupts and resumes data transfer without implementation of an internal memory.

8. A control system according to claim 1, wherein N is equal to 2.

9. A control system according to claim 1, wherein the control system temporally limits each elementary transfer.

* * * * *